United States Patent
Alter et al.

[15] 3,665,194
[45] May 23, 1972

[54] RADON DETECTION

[72] Inventors: Henry Ward Alter, Danville, Calif.; Paul B. Price, Schenectady, N.Y.

[73] Assignee: General Electric Company

[22] Filed: Dec. 27, 1968

[21] Appl. No.: 787,431

Related U.S. Application Data

[63] Continuation-in-part of Ser. No. 654,631, July 19, 1967, abandoned.

[52] U.S. Cl. ..................................250/83 CD, 250/83 C
[51] Int. Cl. .......................................................G01t 1/04
[58] Field of Search..................250/83, 83 C, 83 CD, 83 PH, 250/71, 65

Primary Examiner—James W. Lawrence
Assistant Examiner—Davis L. Willis
Attorney—Ivor J. James, Jr., Samuel E. Turner, John R. Duncan, Frank L. Neuhauser, Oscar B. Waddell and Melvin M. Goldenberg

[57] ABSTRACT

A method and apparatus for detecting and monitoring radon gas and its alpha-emitting daughter products. A sheet of track-registration material is exposed in an area to be monitored, the material having the property of forming damage tracks along paths traversed by alpha particles. After exposure, the material is etched with a reagent to enlarge the tracks, making them visible so they can be counted. The number of tracks formed during the exposure period is a measure of the amount of radon and radon daughters present in the monitored area. The invention is useful as a dosimeter to monitor mine atmospheres, and also has applications in uranium prospecting.

21 Claims, 9 Drawing Figures

Patented May 23, 1972

INVENTORS:
HENRY WARD ALTER
PAUL B. PRICE

BY: John R Duncan

ATTORNEY

RADON DETECTION

CROSS-REFERENCES TO RELATED APPLICATIONS

This application is a continuation-in-part of our copending application Ser. No. 654,631, now abandoned, filed July 19, 1967.

BACKGROUND OF THE INVENTION

Radon-222 is a radioactive gas which emanates from uranium ore. It is a member of the radioactive series which begins with uranium and ends with stable lead-206. Radon-220 or thoron is another form of radon gas which arises from thorium-232. Radon-222 has a half-life of 3.82 days, and radon-220 has a half-life of 56 seconds. Both of these gases emit alpha particles as they decay into daughter products in their respective radioactive series. The invention is applicable to any form of alpha-emitting gas, but is of primary interest with radon-222 because the radon-222 half-life is sufficient to permit this gas to diffuse and travel substantial distances through ore bodies.

Radon-222 (hereinafter "radon") decays through a chain of daughter products which are members of the uranium radioactive series. The radioactive daughter products of immediate interest are radium-A (polonium-218, half-life 3.05 minutes), radium-B (lead-214, half-life 26.8 minutes), radium-C (bismuth-214, half-life 19.7 minutes), and radium-C' (polonium-214, half-life 164 microseconds). Radon, radium-A and radium-C' emit alpha particles when they decay, and radium-B and radium-C emit beta and gamma radiation upon decaying. Radon and its alpha-emitting daughters radium-A and radium-C' are of specific interest as possible health hazards to miners and other personnel who work in atmospheres containing above-normal concentrations of radon.

The problem of radiation exposure arising from breathing a radon-containing atmosphere is extensively discussed in a booklet titled "Control of Radon and Daughters in Uranium Mines and Calculations on Biologic Effects" published in 1957 by the U. S. Department of Health, Education and Welfare (Public Health Service Publication No. 494). Recent investigations supplementing the disclosures in this booklet suggest that an observed higher-than-normal incidence of lung cancer among uranium-ore miners may be due to alpha radiation from radon inhalation and the retention of alpha-emitting radon daughters in the lungs and other tissues. It is thus important to monitor the atmosphere in work spaces such as uranium mines which may have an above-normal concentration of radon and radon daughters ( and hence alpha radiation) due to the presence of large quantities of the uranium parent material.

The radon daughters radium-A and radium-C' are nongaseous elements and when formed by the decay of radon-222 tend to become attached to small dust particles in the air and to "plate-out" on a variety of solid surfaces. The degree of plate-out in an atmosphere containing radon is not predictable since it is dependent upon many variable factors. The nongaseous nature of the daughters makes possible their collection on air filters. The counting of such air filters for alpha activity is a standard technique for radon daughter dosimetry in uranium mines. Of course, accuracy of such measurements suffers where the filter quality varies, and where the time between filtration of the mine atmosphere and the counting operation varies. No permanent direct record is produced with this technique.

Detection and monitoring is also of interest in prospecting for bodies of uranium ore. Radon is created in such ores, and (because it is a gas) has the ability to diffuse through the soil toward the surface of the earth. If the ore deposit is fairly shallow (say within 100 feet of the surface), and the soil overburden is sufficiently porous to permit reasonably rapid gas diffusion, radon emanated from the ore has a sufficient half-life to move to the surface where it can be detected. Uranium prospectors can thus locate subsurface ore bodies by searching for surface areas which show a radon concentration higher than the normal background level (a small amount of uranium is present in normal soil, and a background level of radon is therefore also present in normal soil and the atmosphere).

In the past, various kinds of electronic instrumentation have been used to detect radon. Such equipment is expensive, bulky, usually requires trained operators, and may require special sample-collection techniques. Photographic film has also been used to detect radon because the light-sensitive emulsion of the film will record tracks of alpha particles emitted by radon and some of its daughters. Such film, however, must be packaged in light-tight containers, and must be processed using darkroom techniques.

Radon dosimeters have been developed using conventional silver halide photographic film as the radiation sensitive material. Typical of such dosimeters is that described by Geiger in U.S. Pat. No. 3,283,153. Photographic emulsion, however, will also respond to beta and gamma rays, making alpha particle detection difficult in an environment including alpha, beta and gamma radiation. Also, photographic film will respond to alpha-emitting dust particles plated-out on the film or film cover sheet. As pointed out above, this plate-out will vary depending on a variety of conditions. Thus, it is difficult to estimate the proportion of a total alpha exposure which resulted from plate-out; rendering the results inaccurate. Also, any means designed to prevent plate-out on the film will also tend to undesirably inhibit the flow of radon containing gas past the dosimeter.

Attempts to detect uranium ore bodies below the earth's surface by measuring beta or gamma radiation at or near the surface have generally been ineffective. The detectors in general suffer from low sensitivity and sensitivity to radiation other than that emitted by the uranium ore. Typical techniques which have been attempted include the use of thermoluminescent detectors at the surface of the earth, as described by Ludeman in U.S. Pat. No. 2,275,710 and emanographic techniques using portable electronic radiometers such as are described in POISKI MESTOROZHDENII URANA by V. G. Melkow et al., Moscow 1967, translated in AEC-TR-4529, available from the Office of Technical Services, Department of Commerce.

There thus exists a need for a simple and inexpensive way to detect radon and to monitor its concentration. This need is met by the method and apparatus of this invention.

SUMMARY OF THE INVENTION

It is, therefore, an object of this invention to provide a system for detecting and monitoring radon and radon daughters which overcomes the above-noted problems.

Another object of this invention is to provide an improved radon dosimetry system.

Another object of this invention is to provide an improved uranium prospecting system.

Still another object of this invention is to provide an improved system for continually monitoring the level of radon and radon daughters in an atmosphere.

A further object of this invention is to provide a uranium prospecting system of improved sensitivity and reliability.

We have found that the presence and concentration of radon and its alpha-emitting daughters can be effectively detected and monitored using a process in which alpha-particle tracks in a solid body are made visible by an "etching" technique. This process employs a homogeneous track-registration material which can be a crystalline solid such as mica, or a non-crystalline substance such as inorganic glass or a polymeric plastic. If the detector material is irradiated with charged particles, minute damage "tracks" are created in the material by local alteration of the material structure along the particle trajectories. The damage tracks can be enlarged and made visible by application of a reagent which preferentially attacks the altered material (forming the damage track) at a faster rate than it attacks the unaltered material around the track. This basic track-registration process is described in detail in U.S. Pat. Nos. 3,303,085 and 3,335,278 and in an article beginning on page A1,443 in "Physical Review," Vol. 133, Number 5A (March 1964).

Certain track-registration materials such as cellulosic plastics register damage tracks when subjected to alpha radiation, but do not register beta- and gamma-radiation damage tracks. This selective-sensitivity property is useful in radon dosimetry because radon alpha radiation is considered a possible cause of lung cancer, whereas beta and gamma radiation from radon daughters do not present this hazard. Cellulose nitrate is an especially useful material for selective registration of alpha damage tracks since it has especially high sensitivity and is inexpensive and readily obtainable.

Alpha-track registrative materials, such as cellulosic plastics, have been found to have another unique property which makes them of special utility in radon and radon daughter dosimetry. It has been found that alpha particles above a certain threshold energy, generally about 3.5 MeV, will not form developable tracks. Thus alpha particles originating from radon or radon daughter atoms on or close to the registration material will not form developable tracks. Specifically, radon daughters "plated-out" on the surface of the registration material will not form tracks. Tracks will only be formed by alpha particles originating at least a few centimeters away from the surface of the track registration material so that the alpha particles are degraded in energy by passage through the few centimeters of air to energies less than or equal to the threshold.

Any suitable reagent may be used to etch the damage tracks to make them visible for counting. Typical reagents include sodium hydroxide, potassium hydroxide, ammonium hydroxide, sodium carbonate and mixtures thereof. The sheet may be etched for the time necessary to give well defined tracks. Heating the solution tends to greatly decrease the time necessary to produce easily viewed tracks.

The range of alpha particles in air is relatively short. For example, the alpha particle emitted by radium-C' has an energy of 7.68 MeV, and a range in air of about 6.5 centimeters. If an alpha-track-registering material is isolated by being positioned a distance greater than this range from a source of alpha-emitting solid bodies such as an ore body, any tracks which are formed in the material will arise from the motion (as by convection or diffusion) of a radioactive alpha-emitting gas from a distant source to the material. The half-life of radon is sufficient to permit transportation over a considerable distance before radioactive decay occurs, and radon is the only alpha-emitting gas normally found in appreciable quantities in the neighborhood of uranium ore bodies. Alpha tracks on an isolated track-registration material will thus be formed only by radon or its alpha-emitting daughters, and the material is therefore useful as a radon detector and dosimeter.

The isolated alpha-track-registering material is positioned in a mine to monitor the mine atmosphere (of radon and its daughters), or can be carried by a miner in a badge-type dosimeter. In the uranium-prospecting application of the invention, one or more sheets of track-registering material are buried in the ground in simple containers. After a suitable exposure period, the material is etched to enlarge and make visible the alpha tracks, and the tracks are counted to obtain a measure of the presence and concentration of radon and its alpha-emitting daughters. The entire procedure is carried out in daylight conditions using inexpensive and readily available materials, and sensitive detection of radon is made possible.

Briefly stated, the invention expressed in method terms is a process for detecting radon and alpha-emitting daughter products of radon in an atmosphere. A track-registration material is positioned in the atmosphere at a location spaced from any adjacent alpha-emitting ore bodies or solid surfaces on which plate-out has occurred, a distance greater than a transit range of alpha particles in the atmosphere, whereby the material is exposed to alpha particles emitted by a gaseous source only. The track-registration material is substantially insensitive to light and has a property of forming radiation damage tracks along paths in the material traversed by alpha particles. After an exposure period, the material is etched with a reagent such as sodium hydroxide which selectively attacks and enlarges the damage tracks whereby the tracks are made sufficiently visible to be counted. Preferably, the track-registration material is a cellulose plastic such as cellulose nitrate which forms damage tracks only along paths traversed by alpha particles when irradiated by alpha, beta and gamma radiation.

In terms of apparatus, the invention includes a protective housing, freely open to the atmosphere. A body of track-registration material is disposed within the housing for exposure to the gases. The housing is designed so that all internal surfaces are spaced at least one alpha particle range, generally about 6.5 centimeters, away from the surface of the track-registration material. The material is substantially insensitive to light and has the property of forming damage tracks along paths traversed by alpha particles.

In one form of the invention, a body of calibration material such as uranium glass is secured to and overlays a portion of the track-registration material. The calibration material has the property of emitting alpha particles at a known rate whereby the covered portion of the track-registration material is exposed to a known amount of alpha radiation.

If it should be desired to record alpha particles generated in plated-out particles, a thin cover film may be secured over the track-registration material. This cover film will serve to space the plated-out particles sufficiently far from the track-registration surface that alpha-particles emitted in the plated-out material will be sufficiently degraded in energy to form developable tracks by the time they reach the track-registration surface. This will limit registration to alpha particles from the plated-out material, and high-energy alpha particles from sources near the cover film surface.

BRIEF DESCRIPTION OF THE DRAWINGS

The invention will be described in detail with reference to the attached drawings, in which.

DETAILED DESCRIPTION OF THE INVENTION

Figure 1:
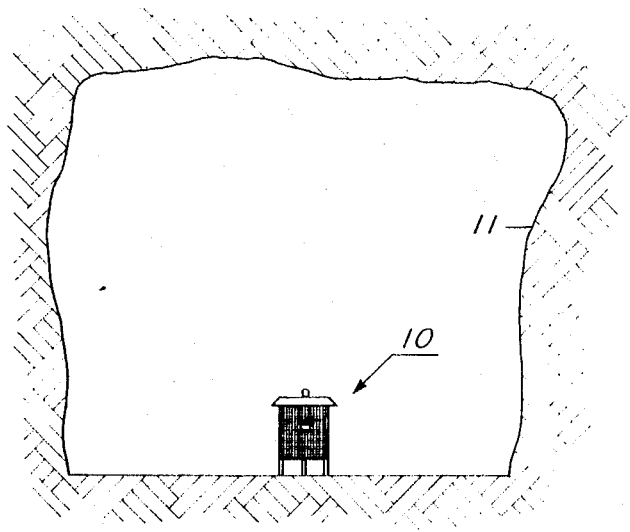
FIG. 1 is a sectional view of a mine tunnel, showing a radon detector positioned to monitor radon in the mine atmosphere.
Figure 3:
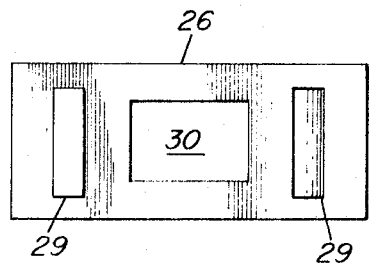
FIG. 3 is a plan view of a holder for a sheet of track-registration material.
Figure 2:
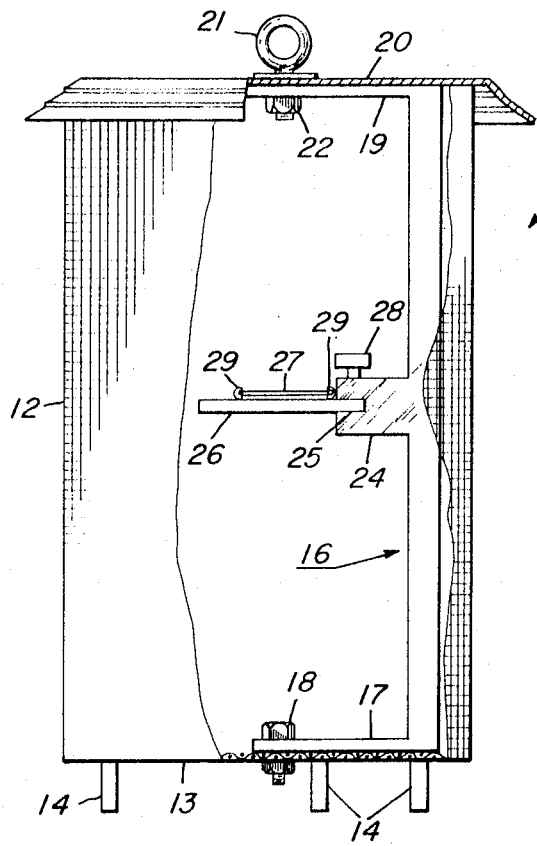
FIG. 2 is an elevation, partly broken away, of a housing suitable for positioning a track-registration material in a mine atmosphere.

Referring to FIG. 1, a radon detection and monitoring assembly 10 is shown positioned on the floor of a tunnel 11 in a uranium mine. Assembly 10 is shown in detail in FIGS. 2 and 3, and includes a cylindrical wire-mesh housing or cage 12 having a wire-mesh bottom portion 13 and being open at its upper end. Wire mesh housing 12 preferably has a very wide mesh, since it should permit free circulation of gases through the housing, while physically protecting the internal structure from damage due to rocks, mine machinery, etc. Assembly 10 is supported by a plurality of legs 14 secured to bottom portion 13.

A C-shaped bracket 16 is positioned in cage 12, and has a lower arm 17 secured to bottom portion 13 by a bolt and nut 18. The bracket has an upper arm 19 which extends horizontally at the open upper end of the cage. A lid or cover 20 closes the open end of the cage, and is secured to the upper arm of the bracket by a flanged bolt 21 and a nut 22 fastened to the upper arm.

A clamp member 24 extends from bracket 16 midway between the upper and lower arms, and includes a slot 25. A holder 26 for a sheet of track-registration material 27 is secured in the slot by a clamp screw 28. The track-registration material is secured to holder 26 by a pair of clips 29. The holder includes a central aperture 30 so the mine atmosphere penetrating wire-mesh cage 12 will reach both faces of the track-registration material.

Figure 4:
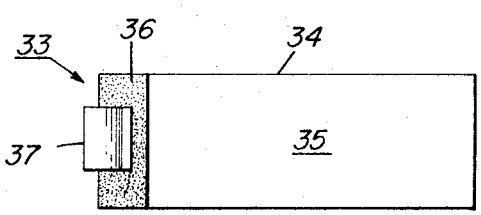
FIG. 4 is a plan view of a glass slide with a coating of track-registration material and a calibration plate.
Figure 5:
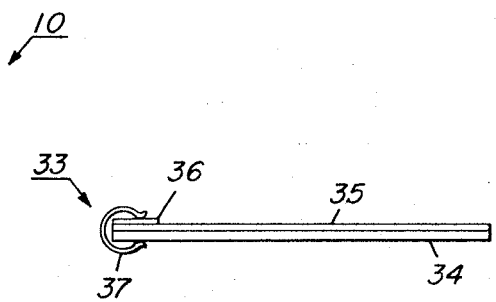
FIG. 5 is a side view of the slide shown in FIG. 4.

Another form of a track-registration material holder 33 is shown in FIGS. 4 and 5, and includes a baseplate 34 such as a conventional glass microscope slide. A film of track-registration material 35 such as cellulose nitrate is coated on one face of the baseplate, or may be in the form of a separate sheet of material which is cemented or otherwise secured to the baseplate by any convenient means. A body of calibration material 36 such as a small sheet of uranium glass is secured to one end of holder 33 by a U-shaped spring clip 37. Holder 33 is positioned in assembly 10 in the same manner as holder 26 described above.

In use, assembly 10 is positioned at any convenient location in a mine shaft or tunnel, and the atmosphere in the mine readily penetrates wire-mesh cage 12. Radon gas and radon daughters present in the mine atmosphere will be manifested by the formation of damage tracks in the track-registration material positioned inside the cage. As discussed above, these damage tracks are formed by alpha particles emitted during the radio active disintegration of radon and its alpha-emitting daughter products radium-A and radium-C'.

After a suitable exposure period of say an eight-hour working shift, the track-registration material is removed from assembly 10 and processed with an etchant such as six-normal sodium hydroxide to make visible the damage tracks. The material can be immersed in the etchant, or the etchant can be swabbed on the surface of the material, and either process is carried out in daylight conditions as the material is not sensitive to light. Etching time is related to etchant temperature, and typically ranges from less than one minute at 70° C, to perhaps several hours at room temperature.

The etched tracks are then counted under a microscope, and the number of tracks per unit area on the track-registration material is a measure of the concentration of radon and its alpha-emitting daughters in the mine atmosphere. The track-registration material serves as a dosimeter or total-dose monitor because it integrates or accumulates the total alpha radiation to which it is subjected during the exposure period.

Calibration of the track-registration material is readily accomplished during the exposure period by covering a portion of the material with a known source of alpha-emitting material. This technique is incorporated in holder 33 shown in FIGS. 4 and 5. Calibration material 36 is preferably a uranium glass having a known content of uranium of perhaps 0.03 percent. The alpha emission from such a uranium glass is known, and that portion of track-registration material 35 covered by the calibration material is thus subjected to a known amount of alpha radiation during the exposure period. The tracks in this calibration zone are counted to provide a standard against which the number of tracks in the uncovered area of the track-registration material can be compared.

The range of alpha particles in a track-registration material such as cellulose nitrate is in the range of about thirty to sixty microns. The tracks are not visible under normal optical magnification before etching. However, after the tracks are enlarged by etching with sodium hydroxide or some other suitable reagent, the tracks are greatly enlarged and are readily visible under a microscope. Naked-eye observation of damage tracks is also possible by the use of track-amplification techniques as described in copending application Ser. No. 592,492, now U.S. Pat. No. 3,415,993. Filed Nov. 7, 1966.

Figure 6:
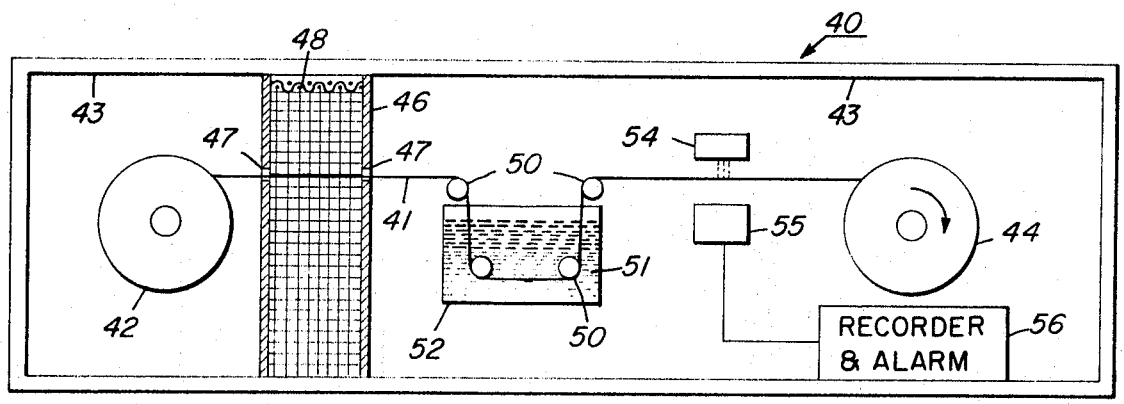
FIG. 6 is a schematic diagram showing a complete system for continuous monitoring and recording of radon in mine atmospheres.

An automated radon-detection system 40 for mine atmospheres and the like is shown in schematic form in FIG. 6. A long strip of track-registration material 41 such as cellulose nitrate is coiled on a feed spool 42 disposed in a housing case 43. The strip of material is secured to a takeup spool 44 which is rotated by a spring motor or electric motor (not shown). A pair of spaced-apart partition walls 46 having slots 47 are secured inside case 43, and a coarse protective wire mesh or screen 48 is secured between the walls. The space enclosed by the screen and the walls is an exposure zone, and the strip of material passes through slots 47 to be exposed to the mine atmosphere as the strip is moved between the feed and takeup spools which form a transport means.

After the track-registration material emerges from the exposure zone, it passes over a guide means such as a set of guide rollers 40 to be immersed in an etching solution 51 such as sodium hydroxide in a tank 52 positioned in case 43. After etching, the strip is transported through a track-detection system such as a photometer having a light source 54 and a photoelectric detector 55 positioned on opposite sides of the strip.

A conventional recorder 56 records the output of the photoelectric detector to provide a permanent record of track density on the etched track-registration material, and thus a record of radon concentration in the mine atmosphere. Preferably, recorder 56 includes an alarm which is triggered automatically as a personnel warning when radon concentration exceeds a predetermined maximum safe level. The various components of the photometric measuring system, strip transport apparatus, recorder and alarm are of conventional design, and, for brevity, will not be described in detail. The system is also useful with the enclosed transport apparatus and strip material along (without the etching bath and measuring means) for long-term time-correlated monitoring of mine atmospheres, with etching being performed as a separate subsequent step in the process.

Figure 7:
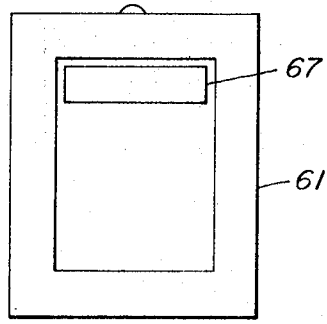
FIG. 7 is an elevation of a radon dosimeter badge.
Figure 8:
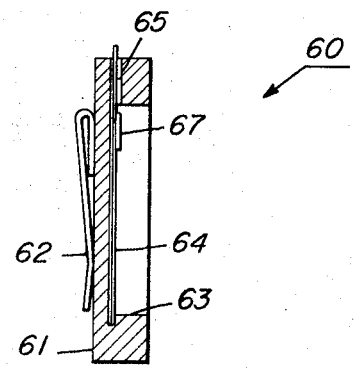
FIG. 8 is a side view of the badge shown in FIG. 7.

The invention is shown in the form of a dosimeter badge 60 in FIGS. 7 and 8. The badge includes a holder 61 having a spring clip 62 secured thereto for fastening the badge to the user's clothing or hat. Holder 61 has a recessed cavity 63 and a sheet or strip of track-registration material 64 such as cellulose nitrate is positioned in the cavity through a slit 65 in the holder. Alpha particles emitted by the gas and its daughter products are detected and recorded on the track-registration material. The material is removed after a suitable exposure period and processed by etching as described above. A piece of calibration material 67 similar to body 36 described above may be included, if desired.

Figure 9:
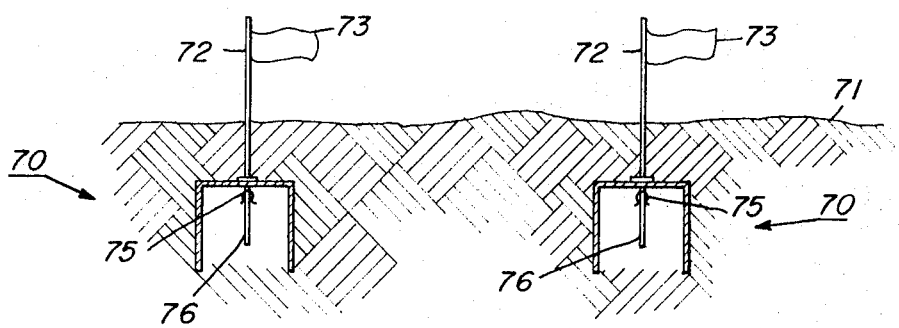
FIG. 9 shows the use of the invention in uranium-ore prospecting.

FIG. 9 shows the use of the invention in exploratory prospecting for uranium ore. A plurality of housings or cannisters 70 are buried in soil 71 at horizontally spaced-apart locations. A rod 72 is secured to each cannister, and extends above the surface to mark the locations of the cannisters. A flag 73 is secured to the upper end of each rod to make it readily visible. The "planting" process can be partially automated by using equipment such as a power-driven post-hole digger, to produce the cannister holes.

Each cannister 70 includes a simple spring clip 75 or a similar conventional clamp, with a sheet of track-registration material 76 held in the clip. Holder 33 described above and illustrated in FIGS. 4 and 5 is also convenient for use in these cannisters, and can be mounted in clip 75. Cannisters 70 are open at the bottom to permit free diffusion of soil gases into the cannisters to contact the track-registration material.

Radon gas present in the soil gas will cause alpha tracks to be formed in the track-registration material, and the presence and concentration of radon in the soil is thus detected. Higher-than-normal concentrations of radon are indicative of an underlying deposit of uranium ore. The use of a plurality of cannisters permits construction of a radon-concentration map of the prospected area.

Cannisters 70 can be of inexpensive construction, and are conveniently formed as metal or plastic cans. The track-registration material is positioned far enough from the bottom of cannister 70 so that alpha particles (typically having a range less than seven centimeters in air) from the soil around the cannister will not have sufficient range to reach the material. Tracks are thus formed in the material only by gas emanating from the soil to reach the track-registration material, and a true measure of radon gas in the soil is thus obtained. The inverted sealed cannister prevents the entrance of ground water into the contained air space.

The track registration material is a sensitive detector of radon and its alpha-emitting daughters. For example, a safe working level in mine atmospheres is presently thought to be about 300 picocuries of radon daughter products per liter of air. This concentration will result in the formation of about 15,000 alpha tracks per square centimeter of track-registration material in a one-month exposure period. Much shorter exposure periods are of course suitable, as individual tracks can be observed during microscopic examination of the etched material.

Any alpha tracks which may have been formed in the material (prior to the intentional exposure period) from background radon normally present in the air can be "erased" by heating the material to its softening point whereby the latent tracks are removed. For example, heating a sheet of cellulose-nitrate track-registration material to about 100° C is adequate to remove unetched latent tracks. The thickness of the track-registration material is preferably at least twenty microns such that the full length of the alpha trajectory is recorded in the material.

The following examples further define several preferred embodiments of the invention. Parts and percentages are by weight unless otherwise indicated.

EXAMPLE I

A holder as shown in FIGS. 7 and 8 is loaded with a piece of cellulose nitrate film having a thickness of about 0.1 inch. The holder is then clipped to the brim of a miner's hard hat. The exposed surface of the film is spaced from all surfaces a distance greater than 10 centimeters.

The miner then spends 6 hours per shift in a mine atmosphere which averages one Working Level (WL) of radon and radon daughter dose rate. The holder is stored in a radon-free atmosphere while not being used. After 4 weeks (20 shifts) the film is removed from the holder, rinsed with water to remove adhering dust, and etched.

The film is etched by placing them in a 6 normal sodium hydroxide solution for about 35 minutes at about 40° C. The film is then water-rinsed to stop the etching action.

Tracks in several areas are counted using a 300 power microscope. Track density is found to be about 3,000 tracks/cm$^2$. Since calibration tests have shown about 25 tracks/cm$^2$ for each WL-hour of exposure, the miner's integrated exposure during the 4 week period is about 120 WL-hours.

EXAMPLE II

It is desired to continually monitor the varying radon and radon daughter content of a uranium mine. A device such as is shown in FIG. 6 is assembled. A web of cellulose acetate film having a width of about 0.5 inch and a thickness of about 0.1 inch is moved through the device at a rate of about 1 inch per hour with the exposure portion of the device such that the film is exposed for about 2 hours. The processing bath is so arranged that the film is etched for about 3 hours at room temperature. The processing bath consists of 5 normal sodium hydroxide. Where the device is operating in a 5 WL environment, the track density on the exposed film will be about 250 tracks per square centimeter. The tracks may be counted by an operator with a microscope, or a continuous conventional photometric system (such as that shown in FIG. 6) may be connected to a conventional chart recorder which is calibrated to read in WL directly.

EXAMPLE III

It is desired to determine whether a body of uranium ore underlies an area, and, if so, the approximate boundaries of the ore body. A gamma ray survey of the area does not reveal any differences across the area.

One hundred 2-foot deep holes are dug at 50 foot intervals along a substantially straight line across the area with a power post hole auger. Inverted cup-shaped cannisters, including a piece of 0.2 inch cellulose nitrate film, such as are shown in FIG. 9, are placed in each hole and the holes the holes are back filled. After 2 weeks, the cannisters and films are removed.

The films are "developed" by etching in a 5 normal potassium carbonate solution at room temperature for about 5 hours.

The number of tracks on each film are counted using a 400 power microscope. Along the line of holes, the first 10 and last 40 films are found to have an average of about 500 tracks/cm$^2$, while the intermediate 50 films have an average of about 5,000 tracks/cm$^2$. Follow-up core drilling shows that the intermediate 50 film were over an ore body located about 50 feet below the surface under an overburden consisting of fissured sedimentary rock overlain with about 5 feet of soil, while the other films were over areas barren of uranium ore. Thus, the great difference in track density clearly shows the presence of uranium ore.

There has been described a method and apparatus for monitoring radon gas and its alpha-emitting daughter products in mine atmospheres and in soil during uranium prospecting. The method is simple and inexpensive to practice, and uses readily available materials which can be processed in daylight by unskilled workers. Radon concentration is quickly determined by counting tracks formed in the track-registration material during microscopic examination. The method is particularly useful as it records only alpha radiation which is thought to be a primary concern from the health standpoint. Any suitable material may be used in the track-registration material, etching baths, etc., and other ingredients may be added thereto to enhance or otherwise modify their properties. The track-registration material can be mounted in many different types of containers or cannisters, badges, automatic transport systems, and the like. All such forms of the invention are intended to be encompassed within the scope of the invention as defined in the following claims.

We claim:

1. A method for detecting alpha radiation from radon and alpha-emitting daughter products of radon in an atmosphere free of any indication of beta and gamma radiation, comprising the steps of:

positioning an unshielded track-registration material freely open to the atmosphere at a location spaced from any adjacent surfaces on which plate-out can occur and alpha-emitting bodies a distance greater than a transit range of alpha particles in the atmosphere, whereby the material is exposed to alpha particles emitted by gaseous sources dispersed in the atmosphere only, the track-registration material having a property of forming damage tracks along paths in the material traversed by alpha particles and being substantially insensitive to light and to alpha particles originating on or immediately adjacent the surface of the material; and etching the material after exposure with a reagent which selectively attacks and enlarges the damage tracks whereby the tracks are made sufficiently visible to be counted.

2. The method defined in claim 1 in which the track-registration material has a selective-sensitivity property of forming damage tracks only along paths in the material traversed by alpha particles when irradiated by alpha, beta and gamma radiation.

3. The method defined in claim 2 in which the track-registration material is cellulose nitrate.

4. A method of prospecting for uranium ore in the earth by detecting alpha radiation from radon and alpha-emitting daughter products of radon free of any indication of beta and gamma radiation, comprising the steps of:

positioning an unshielded track-registration material in the earth for direct exposure to radon gas and daughter products emanating from the ore, the track-registration material being located from adjacent surfaces on which plate-out can occur and alpha-emitting ore bodies a distance greater than a transit range of alpha particles in the atmosphere whereby the track-registration material is exposed to alpha particles emitted by gaseous sources only, and the track-registration material having a property of forming damage tracks along paths in the material traversed by alpha particles emitted by the radon;

recovering the track-registration material after exposure; and etching the exposed material with a reagent which selectively attacks and enlarges the damage tracks whereby the tracks are made sufficiently visible to be counted.

5. The method defined in claim 4 in which the track-registration material is substantially insensitive to light, to beta and gamma radiation and to alpha particles originating on or immediately adjacent the surface of the material.

6. The method defined in claim 5 in which the track-registration material is cellulose nitrate.

7. The method defined in claim 4 in which the reagent is sodium hydroxide.

8. The method defined in claim 4 in which a plurality of track-registration materials are buried at spaced-apart locations in a region and subsequently recovered and etched, whereby a map of radon distribution in the region can be constructed.

9. A radiation dosimeter for monitoring exposure of personnel to alpha radiation from radon and alpha-emitting radon daughter products free of any indication of beta and gamma radiation, comprising:

an unenclosed holder adapted to be carried by personnel;

a sheet of track-registration material disposed in the unenclosed holder freely open to atmospheric gases including radon and radon daughters, the track-registration material being located from adjacent surfaces on which plate-out can occur and alpha-emitting bodies a distance greater than a transit range of alpha particles in the atmosphere whereby the track-registration material is exposed to alpha particles emitted by gaseous sources only, the track-registration material being substantially insensitive to light and having a property of forming damage tracks along paths in the material traversed by alpha particles.

10. The dosimeter defined in claim 9 in which the track-registration material has a selective sensitivity property of forming damage tracks only along paths in the material traversed by alpha particles when irradiated by alpha, beta and gamma radiation and a property of being insensitive to alpha particles originating on or immediately adjacent the surface of the material.

11. The dosimeter defined in claim 9 in which the track-registration material is cellulose nitrate.

12. Apparatus for detecting alpha radiation from radon and alpha-emitting radon daughter products free of any indication of beta and gamma radiation, comprising:

a protective housing defining an enclosed space, the housing being readily penetrable by light and atmospheric gases and substantially impervious to large solid matter whereby only gases circulate through the enclosed space; and a body of track-registration material disposed in the enclosed space of the housing for exposure to the gases, the track-registration material being located from adjacent surfaces and alpha-emitting bodies a distance greater than a transit range of alpha particles in the atmosphere whereby the material is exposed to alpha particles emitted by gaseous sources only, the track-registration material being substantially insensitive to light and having the property of forming damage tracks along paths in the material traversed by alpha particles.

13. The apparatus defined in claim 12, and further comprising a body of calibration material secured to and overlying a portion of the track-registration material, the calibration material having the property of emitting alpha particles at a known rate, whereby the portion of the track-registration material covered by the calibration material is exposed to a known amount of alpha radiation.

14. The apparatus defined in claim 12 in which the track-registration material has a selective sensitivity property of forming damage tracks only along paths in the material traversed by alpha particles when irradiated by alpha, beta and gamma radiation and a property of being insensitive to alpha particles originating on or immediately adjacent the surface of the material.

15. The apparatus defined in claim 13 in which the calibration material is uranium glass and the track-registration material is cellulose nitrate.

16. The apparatus defined in claim 12 and further comprising transport means in the housing and including a feed spool and a takeup spool for transporting the track-registration material through the enclosed space, the material being in the form of an elongated strip coupled to and extending between the spools.

17. The apparatus defined in claim 16 and further comprising a tank in the housing and adapted to hold an etching reagent, and means for guiding the material through the tank for etching of the damage tracks after the material is exposed to gases in the enclosed space.

18. The apparatus defined in claim 17 and further comprising measuring means in the housing between the tank and the takeup spool for detecting and measuring the presence of etched damage tracks in the track-registration material.

19. A radon detection assembly for uranium-ore prospecting enabling detection of alpha radiation from radon and alpha-emitting radon daughter products free of any indication of beta and gamma radiation, comprising:

a housing adapted for burial in soil, the housing being readily penetrable by soil gases and freely open to the atmosphere;

an unshielded body of track-registration material secured in the housing for direct exposure to soil gases, the track-registration material being located from adjacent surfaces and alpha-emitting ore bodies a distance greater than a transit range of alpha particles in the atmosphere, whereby the material is exposed to alpha particles emitted by gaseous sources only, the track-registration material being substantially insensitive to light and having the property of forming damage tracks along paths in the material traversed by alpha particles emitted by radon in the soil gas and by alpha-emitting radon daughter products; and marking means secured to and extending from the housing to be visible above the soil when the housing is buried.

20. The assembly defined in claim 19 in which the housing is sufficiently large that alpha particles emitted by soil surrounding the housing when it is buried have insufficient range to form damage tracks in the track-registration material within the housing, whereby damage tracks are formed in the material only by alpha particles emitted from sources originally transported into the housing in gaseous form.

21. The assembly defined in claim 20 in which the track-registration material is cellulose nitrate.

* * * * *

UNITED STATES PATENT OFFICE
CERTIFICATE OF CORRECTION

Patent No. 3,665,194　　　　　　　　　Dated May 23, 1972

Inventor(s) Henry Ward Alter and Paul B. Price

It is certified that error appears in the above-identified patent and that said Letters Patent are hereby corrected as shown below:

Column 5, line 75, after "Pat. No. 3,415,993" replace the period with a comma and change "Filed" to --filed--. Column 6, line 34, after "material" change "along" to --alone--. Column 8, line 7, delete second occurrence of "the holes"; and line 17, after "50" change "film" to --films-- (plural).

Signed and sealed this 5th day of December 1972.

(SEAL)
Attest:

EDWARD M. FLETCHER, JR.　　　　　　　ROBERT GOTTSCHALK
Attesting Officer　　　　　　　　　　Commissioner of Patents